(12) United States Patent
Park et al.

(10) Patent No.: US 10,156,751 B2
(45) Date of Patent: Dec. 18, 2018

(54) DISPLAY DEVICE

(71) Applicant: SAMSUNG DISPLAY CO., LTD., Yongin-si, Gyeonggi-do (KR)

(72) Inventors: Seunghyun Park, Yongin-si (KR); Junho Song, Yongin-si (KR); Sungin Ro, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/825,449

(22) Filed: Nov. 29, 2017

(65) Prior Publication Data

US 2018/0157103 A1 Jun. 7, 2018

(30) Foreign Application Priority Data

Dec. 1, 2016 (KR) .................. 10-2016-0162796

(51) Int. Cl.
*G02F 1/1335* (2006.01)
*G02F 1/1343* (2006.01)

(52) U.S. Cl.
CPC .. *G02F 1/133514* (2013.01); *G02F 1/134336* (2013.01)

(58) Field of Classification Search
CPC ................ G02F 1/133514; G02F 1/133371
See application file for complete search history.

(56) References Cited

U.S. PATENT DOCUMENTS

| 7,452,604 | B2 | 11/2008 | Takagi et al. |
| 2016/0033813 | A1 | 2/2016 | Yoon et al. |
| 2016/0033816 | A1 | 2/2016 | Yoon et al. |

FOREIGN PATENT DOCUMENTS

| KR | 10-0644006 B1 | 1/2005 |
| KR | 10-2015-0135691 A | 12/2015 |
| KR | 10-2016-0017187 A | 2/2016 |
| KR | 10-2016-0017188 A | 2/2016 |

*Primary Examiner* — Phu Vu
(74) *Attorney, Agent, or Firm* — Lee & Morse P.C.

(57) ABSTRACT

A display device includes a substrate including first, second, third, and fourth pixel areas, first, second, and third color filters at the first, second, and third pixel areas on the substrate, respectively, and a fourth color filter at the fourth pixel area on the substrate, the fourth color filter having a plurality of holes, wherein the plurality of holes includes a first hole, a second hole, and a third hole adjacent to each other, and wherein a first imaginary straight line passing through a center of the first hole and a center of the second hole has an angle in a range from about 20 degrees to about 80 degrees with respect to a second imaginary straight line passing through the center of the first hole and a center of the third hole.

14 Claims, 5 Drawing Sheets

DISPLAY DEVICE

CROSS-REFERENCE TO RELATED APPLICATION

Korean Patent Application No. 10-2016-0162796, filed on Dec. 1, 2016, in the Korean Intellectual Property Office (KIPO), and entitled: "DISPLAY DEVICE," is incorporated by reference herein in its entirety.

BACKGROUND

1. Field

Embodiments of the present disclosure relate to a display device.

2. Description of the Related Art

Display devices display images using an element which emits light. In recent times, flat panel display ("FPD") devices are widely used. The FPD devices may be classified into liquid crystal display ("LCD") devices, organic light emitting diode (OLED) display devices, plasma display panel (PDP) devices and electrophoretic display devices based on a light emitting scheme thereof.

SUMMARY

According to an exemplary embodiment, a display device may include a substrate including first, second, third and fourth pixel areas, first, second and third color filters at the first, second and third pixel areas on the substrate, respectively, and a fourth color filter at the fourth pixel area on the substrate, the fourth color filter having a plurality of holes. The plurality of holes include a first hole, a second hole and a third hole adjacent to each other, and a first imaginary straight line passing through a center of the first hole and a center of the second hole has an angle in a range from about 20 degrees to about 80 degrees with respect to a second imaginary straight line passing through the center of the first hole and a center of the third hole.

A distance between the center of the first hole and the center of the second hole, a distance between the center of the second hole and the center of the third hole and a distance between the center of the third hole and the center of the first hole may be substantially equal to each other.

The plurality of holes may be arranged in a zigzag manner.

The plurality of holes may have one of a circular shape, an elliptical shape, a semicircular shape and a polygonal shape on a plane.

The plurality of holes may have a polygonal shape on a plane and a vertex of the polygon may have a round shape.

The plurality of holes may have a semicircular shape at least a part of an edge area of the fourth pixel area.

The first color filter may be a red color filter, the second color filter may be a green color filter and the third color filter may be a blue color filter.

The fourth color filter may include a material substantially the same as a material included in at least one of the first, second and third color filters.

The fourth color filter and the third color filter may be unitary.

The display device may further include a plurality of pixel electrodes disposed at the first, second, third and fourth pixel areas on the substrate, respectively.

An overlap area between the plurality of holes and the pixel electrode at the fourth pixel area may be about 25% to about 45% of a planar area of the pixel electrode at the fourth pixel area.

The plurality of pixel electrodes may include a conductive material having reflectance.

The display device may further include a plurality of thin film transistors connected to the plurality of pixel electrodes, respectively.

The display device may further include a reflective layer between the substrate and the first, second, third and fourth color filters.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will also be understood that when an element, e.g., a layer, is referred to as being "on" another layer or substrate, it can be directly on the other layer, element, or substrate, or intervening layers or elements may also be present. Further, it will be understood that when a layer is referred to as being "below" another layer, it can be directly below, or one or more intervening layers may also be present. In addition, it will also be understood that when a layer is referred to as being "between" two layers, it can be the only layer between the two layers, or one or more intervening layers may also be present. Conversely, when a layer, area, or plate is referred to as being "directly on" or "directly below" another layer, area, or plate, intervening layers, areas, or plates may be absent therebetween. Similarly, when an element is referred to as being "connected" to another element, the element may be "directly connected" to the other element, or "electrically connected" to the other element with one or more intervening elements interposed therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present disclosure and like reference numerals refer to like elements throughout the specification.

Hereinafter, a first exemplary embodiment will be described with reference to FIGS. 1-4. The display device according to the first exemplary embodiment will be described with respect to a LCD device by way of example. However, the scope of the present disclosure is not limited to the LCD device and aspects of the present disclosure may be applied to an OLED display device and the like.

Figure 1:
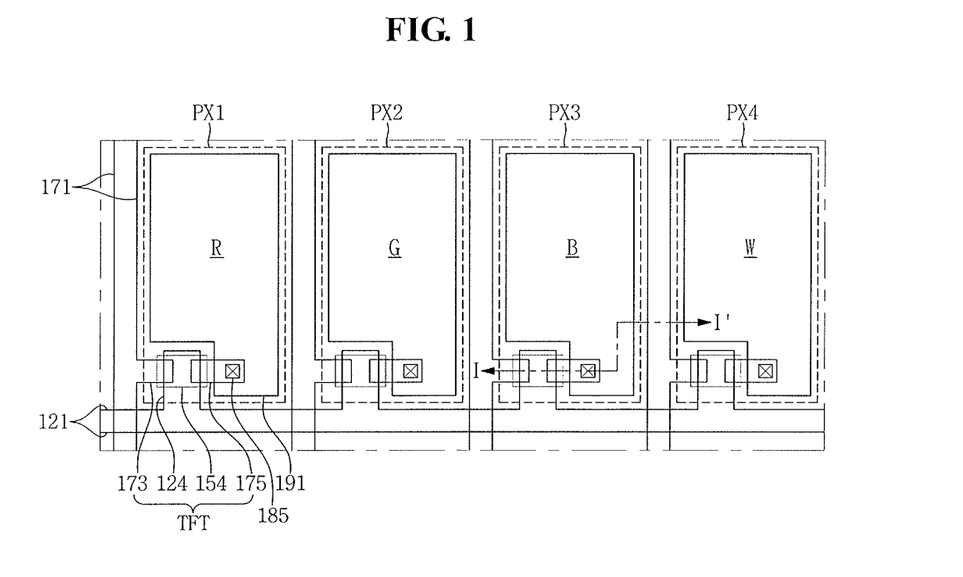
FIG. 1 illustrates a schematic plan view of a plurality of pixels according to an exemplary embodiment.
Figure 2:
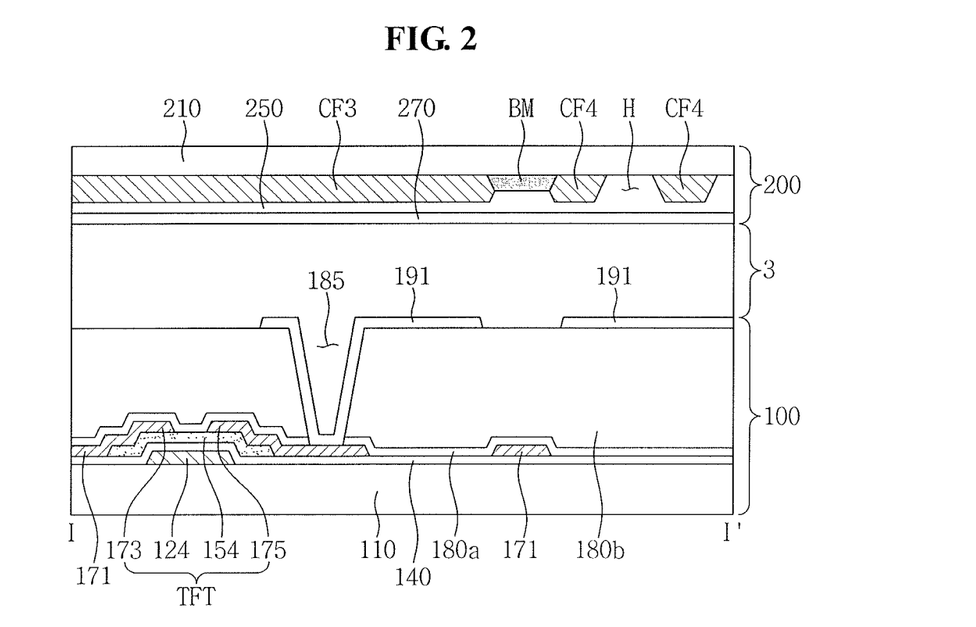
FIG. 2 illustrates a cross-sectional view taken along line I-I' of FIG. 1.
Figure 3:
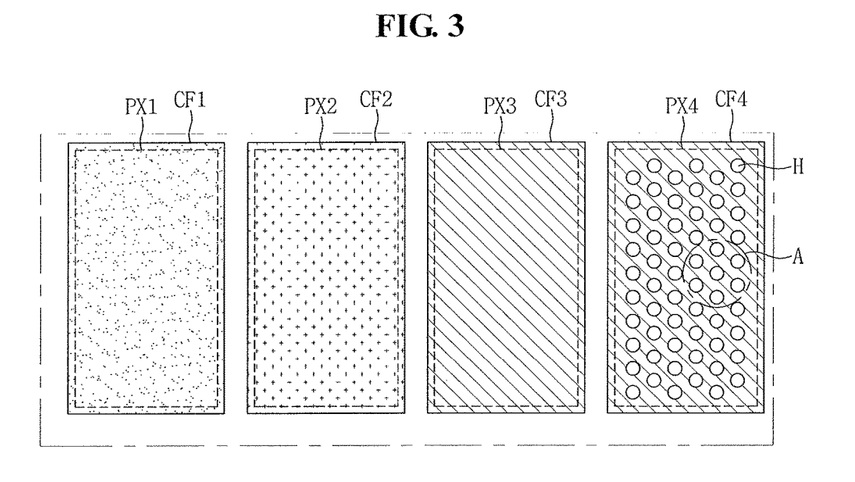
FIG. 3 illustrates a schematic plan view of first, second, third and fourth color filters according to an exemplary embodiment.

FIG. 1 is a plan view schematically illustrating a plurality of pixels according to a first exemplary embodiment, FIG. 2 is a cross-sectional view taken along the line I-P of FIG. 1, and FIG. 3 is a plan view schematically illustrating first, second, third and fourth color filters according to a first exemplary embodiment.

Referring to FIG. 1, a display device according to a first exemplary embodiment may include first, second, third, and fourth pixel areas PX1, PX2, PX3, and PX4, respectively. In such an exemplary embodiment, it is assumed that the first, second, third, and fourth pixel areas PX1, PX2, PX3, and PX4 are a red pixel area PX1, a green pixel area PX2, a blue pixel area PX3, and a white pixel area PX4 emitting lights of red R, green G, blue B, and white W, respectively.

A thin film transistor ("TFT") and a pixel electrode 191 connected to the TFT may be disposed in each of the first, second, third, and fourth pixel areas PX1, PX2, PX3, and PX4. Each TFT is connected to a gate line 121 and a data line 171.

The gate line 121 and the data line 171 are arranged in a matrix to define the first, second, third, and fourth pixel areas PX1, PX2, PX3, and PX4. For example, as illustrated in FIG. 1, the first pixel area PX1, the second pixel area PX2, the third pixel area PX3, and the fourth pixel area PX4 are arranged in a matrix of 1×4 to form a pixel group. Although one pixel group is depicted in FIG. 1 for ease of description, in practice, a plurality of pixel groups are arranged in a matrix form having a plurality of rows and a plurality of columns. Since the plurality of pixel groups have a substantially same structure, only one pixel group will be described as an example for ease of explanation. Herein, the pixel group is depicted as a matrix of 1×4, but exemplary embodiments are not limited thereto. The shape of the pixel group may be variously modified, e.g., in a linear shape, a V shape, a Z shape, and the like.

Each of the components constituting the display device according to a first exemplary embodiment will be described in detail below with reference to FIGS. 1-2. Referring to FIGS. 1 and 2, the display device according to the first exemplary embodiment may include a lower display panel 100 and an upper display panel 200 facing each other, and a liquid crystal layer 3 between the lower display panel 100 and the upper display panel 200.

The lower display panel 100 may include a first substrate 110, the TFT, a gate insulating layer 140, a first insulating layer 180a, a second insulating layer 180b, and the pixel electrode 191. Herein, the TFT may include a gate electrode 124, a semiconductor layer 154, a source electrode 173, and a drain electrode 175.

The first substrate 110 may be an insulating substrate having light transmitting characteristics and flexible characteristics, e.g., a plastic substrate. However, exemplary embodiments are not limited thereto and the first substrate 110 may include a hard substrate, e.g., a glass substrate.

The gate electrode 124 and the gate line 121 may be disposed on the first substrate 110. In such an exemplary embodiment, the gate electrode 124 may have a shape protruding from the gate line 121 toward the pixel electrode 191.

For example, the gate electrode 124 may include at least one of aluminum (Al) or alloys thereof, silver (Ag) or alloys thereof, copper (Cu) or alloys thereof, molybdenum (Mo) or alloys thereof. In another example, the gate electrode 124 may include at least one of chromium (Cr), tantalum (Ta), and/or titanium (Ti). In an exemplary embodiment, the gate electrode 124 may have a multilayer structure including at least two conductive layers that have different physical properties An end portion of the gate line 121 may be connected to another layer or an external driving circuit. The end portion of the gate line 121 may have a larger planar area than a planar area of another portion of the gate line 121. The gate line 121 may include a substantially same material and have a substantially same structure (a multilayer structure) as those of the gate electrode 124. The gate line 121 and the gate electrode 124 may be formed substantially simultaneously in a substantially same process.

The gate insulating layer 140 may be disposed on the gate line 121. The gate insulating layer 140 may include an inorganic insulating material, e.g., silicon nitride ($SiN_x$) or silicon oxide ($SiO_x$). The gate insulating layer 140 may have a multilayer structure including at least two insulating layers having different physical properties.

The plurality of semiconductor layers 154 may be disposed on the gate insulating layer 140. The semiconductor layer 154 overlaps at least a portion of the gate electrode 124, as illustrated in FIGS. 1 and 2.

The semiconductor layer 154 may include, e.g., amorphous silicon, polycrystalline silicon, or an oxide semiconductor. The oxide semiconductor may include at least one of, e.g., zinc (Zn), gallium (Ga), indium (In) and tin (Sn). For example, the oxide semiconductor may include an oxide semiconductor material, e.g., an oxide based on zinc (Zn), gallium (Ga), tin (Sn) or indium (In), or a composite oxide, e.g., indium-gallium-zinc oxide ($InGaZnO_4$), indium-zinc oxide (In—Zn—O), or zinc-tin oxide (Zn—Sn—O).

In an exemplary embodiment, an ohmic contact layer may be disposed on the semiconductor layer 154. For example, the ohmic contact layer may include silicide or n+ hydrogenated amorphous silicon doped with n-type impurities, e.g., phosphorus (P), at high concentration. A plurality of ohmic contact layers may be positioned on the semiconductor layer 154, e.g., in pairs.

Data conductors 171, 173 and 175 including the plurality of data lines 171, the source electrode 173, and the drain electrode 175 may be disposed on the gate insulating layer 140 and the semiconductor layer 154.

The source electrode 173 overlaps the semiconductor layer 154 and the gate electrode 124. The source electrode 173 may have a shape protruding from the data line 171 toward the gate electrode 124. The source electrode 173 and the data line 171 may be unitary. The source electrode 173 may be a part of the data line 171.

The source electrode 173 may include a refractory metal, e.g., molybdenum, chromium, tantalum and titanium, and/or an alloy thereof. The source electrode 173 may have a multilayer structure including a refractory metal layer and a low-resistance conductive layer. Examples of the multilayer structure may include a double-layer structure including a chromium or molybdenum (alloy) lower layer and an aluminum (alloy) upper layer; and a triple-layer structure including a molybdenum (alloy) lower layer, an aluminum (alloy) intermediate layer and a molybdenum (alloy) upper layer. In an exemplary embodiment, the source electrode 173 may include or be formed of any suitable metals and/or conductors rather than the aforementioned materials.

The data line 171 may be disposed on the gate insulating layer 140. An end portion of the data line 171 may be connected to another layer or an external driving circuit. The end portion of the data line 171 may have a larger planar area than a planar area of another portion of the data line 171. The data line 171 may include a substantially same material and have a substantially same structure (a multilayer structure) as those of the source electrode 173. The data line 171 and the source electrode 173 may be formed substantially simultaneously in a substantially same process.

The data line 171 crosses the gate line 121. A portion of the data line 171 crossing the gate line 121 may have a line width less than a line width of another portion of the data line 171, and a portion of the gate line 121 crossing the data line 171 may have a line width less than a line width of another portion of the gate line 121. Accordingly, a parasitic capacitance between the data line 171 and the gate line 121 may be reduced.

The drain electrode 175 may be disposed on the gate insulating layer 140 and the semiconductor layer 154 at a predetermined distance from the source electrode 173. The drain electrode 175 may overlap the semiconductor layer 154 and the gate electrode 124. A channel area of the TFT may be positioned between the drain electrode 175 and the source electrode 173.

The drain electrode 175 is connected to the pixel electrode 191 through a contact hole 185. The drain electrode 175 may include a substantially same material and have a substantially same structure (a multilayer structure) as those of the source electrode 173. In other words, the drain electrode 175 and the source electrode 173 may be formed substantially simultaneously in a substantially same process.

The gate electrode 124, the source electrode 173, and the drain electrode 175, together with the semiconductor layer 154, define the TFT. In such an exemplary embodiment, a channel area of the TFT is positioned at a portion of the semiconductor layer 154 between the source electrode 173 and the drain electrode 175.

The first insulating layer 180a may be disposed on the data conductors 171, 173 and 175, the exposed portion of the semiconductor layer 154, and the gate insulating layer 140. The first insulating layer 180a may be disposed over an entire surface of the first substrate 110, and the first insulating layer 180a may include an organic insulating material or an inorganic insulating material. In an exemplary embodiment, the first insulating layer 180a may be omitted.

The second insulating layer 180b may be disposed on the first insulating layer 180a. The second insulating layer 180b may include an organic material. The second insulating layer 180b is configured to planarize an upper portion of the first insulating layer 180a.

The pixel electrode 191 may be disposed on the second insulating layer 180b. The pixel electrode 191 may be electrically connected to the drain electrode 175 through the contact hole 185 to receive the data voltage. The pixel electrode 191 may include a transparent conductive material, e.g., indium tin oxide (ITO) or indium zinc oxide (IZO). In such an exemplary embodiment, e.g., ITO may be a polycrystalline material or a monocrystalline material, and IZO may also be a polycrystalline material or a monocrystalline material. In addition, the pixel electrode 191 may include a conductive material having reflectivity.

The upper display panel 200 may include a second substrate 210, a light blocking layer BM, first, second, third, and fourth color filters CF1, CF2, CF3, and CF4, an overcoat layer 250, and a common electrode 270.

The second substrate 210 may be an insulating substrate having light transmitting characteristics and flexible characteristics, e.g., a plastic substrate. However, exemplary embodiments are not limited thereto, and the second substrate 210 may include a hard substrate such as a glass substrate.

The light blocking layer BM may define an opening area through which light is transmitted. The light blocking layer BM is also referred to as a black matrix and may define a pixel area. The light blocking layer BM may include a metal, e.g., chromium oxide ($CrO_x$) or an opaque organic film material.

Referring to FIGS. 1-3, the first color filter CF1, the second color filter CF2, the third color filter CF3, and the fourth color filter CF4 may be disposed in correspondence to the first pixel area PX1, the second pixel area PX2, the third pixel area PX3, and the fourth pixel area PX4 on the second substrate 210, respectively. The first color filter CF1, the second color filter CF2, the third color filter CF3, and the fourth color filter CF4 may include an organic material.

According to a first exemplary embodiment, the first color filter CF1, the second color filter CF2, and the third color filter CF3 may be a red R color filter, a green G color filter, and a blue B color filter, respectively. The fourth color filter CF4 includes a material substantially the same as a material included in at least one of the first, second, and third color filters CF1, CF2 and CF3. In such an exemplary embodiment, a color filter corresponding to one of red R, green G, and blue B that has relatively low color reproducibility may be disposed at the fourth pixel area PX4 which is a white W pixel area. That is, by disposing one of the red R, green G, and blue B color filters at the fourth pixel area PX4, which is the white W pixel area, color reproducibility of one of the red R, green G, and blue B color filters may be improved.

For example, as illustrated in FIG. 3, the fourth color filter CF4 according to a first exemplary embodiment includes a material substantially the same as a material included in the third color filter CF3. That is, the fourth color filter CF4 is the blue B color filter. The color reproducibility of the blue B may be improved by disposing the blue B color filter at the fourth pixel area PX4 which is the white W pixel area.

In addition, by disposing one of the red R, green G, and blue B color filters at the fourth pixel area PX4, which is the white W pixel area, a step difference of the white W pixel area may be compensated. As the step difference is compensated, visibility may be improved.

The fourth color filter CF4 has a plurality of holes H which are arranged in a zigzag manner on a plane. For example, as illustrated in FIG. 2, each one of the plurality of holes H penetrates through an entire thickness of the fourth color filter CF4, so white light may be emitted through the plurality of holes H, e.g., while colored light may be emitted through portions of the fourth color filter CF4 without the holes H. For example, as illustrated in FIG. 3, the plurality of holes H may be arranged in a zigzag pattern, so the holes H are arranged along diagonal lines with respect to the vertical and horizontal edges of the fourth color filter CF4, e.g., every two adjacent columns of holes H may be vertically offset with respect to each other to define the zigzag pattern. By arranging the plurality of holes H in the zigzag manner on the plane, i.e., as viewed in a top view, the fourth color filter CF4 may have a number of holes H within a limited area, e.g., the fourth color filter CF4 may have a larger number of holes H within a same area (as compared to a matrix pattern of holes arranged along aligned rows and columns). Thus, an area for outputting white light may be increased in the fourth pixel area PX4, e.g., due to the larger number of holes H through the fourth color filter CF4.

For example, an overlap area between the plurality of holes H and the pixel electrode 191 disposed at the fourth pixel area PX4 may be about 25% to about 45% of a planar area of the pixel electrode 191 disposed at the fourth pixel area PX4. On the other hand, if the plurality of holes H were not arranged in a zigzag manner, an overlap area between the plurality of holes H and the pixel electrode 191 disposed at the fourth pixel area PX4 would be only about 10% to about 20% of the planar area of the pixel electrode 191 disposed at the fourth pixel area PX4. Accordingly, in the display device according to the first exemplary embodiment, as the fourth color filter CF4 includes a plurality of holes H disposed at the fourth pixel area PX4 in the zigzag pattern, e.g., so an amount of emitted white light through a total area of the plurality of holes H may be larger compared to a non-zigzag pattern of holes H, luminance of the display device may be improved.

Although the plurality of holes H according to the first exemplary embodiment are depicted as having a circular shape on a plane, exemplary embodiments are not limited thereto. In an exemplary embodiment, the plurality of holes H may have one of elliptical, semicircular and polygonal shapes.

The overcoat layer 250 may be disposed on the first, second, third, and fourth color filters CF1, CF2, CF3, and CF4. In such an exemplary embodiment, the overcoat layer 250 may be also disposed above the plurality of holes H of the fourth color filter CF4. The overcoat layer 250 serves to substantially prevent exposure of the first, second, third, and fourth color filters CF1, CF2, CF3, and CF4 and to planarize an upper surface of the second substrate 210 on which the first, second, third, and fourth color filters CF1, CF2, CF3, and CF4 are disposed.

The common electrode 270 may be disposed on the overcoat layer 250. The common electrode 270 may include a transparent conductive material, e.g., ITO or IZO. In such an exemplary embodiment, ITO may be a polycrystalline or monocrystalline material, and IZO may be a polycrystalline or monocrystalline material. The common electrode 270 which receives a common voltage generates an electric field over the liquid crystal layer 3 together with the pixel electrode 191 which receives a data voltage, to thereby determine orientation of liquid crystal molecules of the liquid crystal layer 3 and display an image.

Alignment layers may be disposed on respective inner surfaces of the two display panels 100 and 200. The alignment layers may be vertical alignment layers or photo-alignment layers including a photo-polymerizable material.

In addition, polarizers may be disposed on respective outer surfaces of the display panels 100 and 200, and polarization axes of the two polarizers may be orthogonal or parallel to each other. In the case of a reflective LCD device, one of the two polarizers may be omitted.

The liquid crystal layer 3 between the lower display panel 100 and the upper display panel 200 includes the liquid crystal molecules, and the liquid crystal molecules may be aligned so that major axes of the liquid crystal molecules are horizontal with respect to surfaces of the two display panels 100 and 200 in the absence of an electric field. The liquid crystal layer 3 may have a positive dielectric anisotropy or may have a negative dielectric anisotropy. The liquid crystal molecules of the liquid crystal layer 3 may be oriented to have a pre-tilt in a predetermined direction and the pre-tilt direction of the liquid crystal molecules may vary depending on the dielectric anisotropy of the liquid crystal layer 3.

Figure 4:
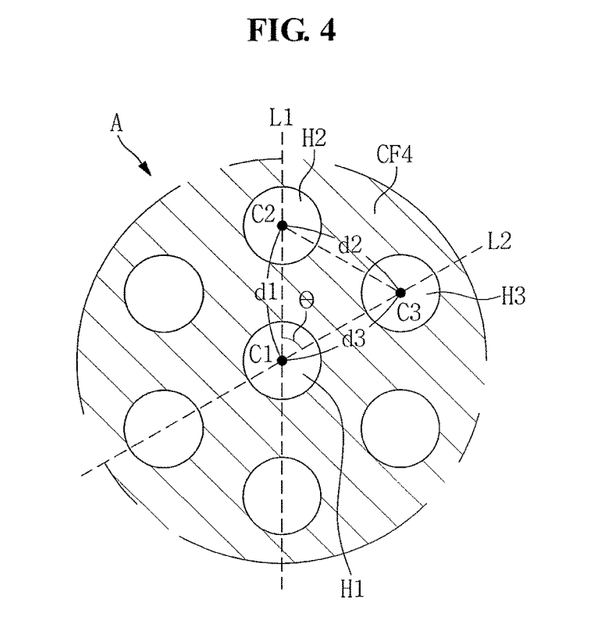
FIG. 4 illustrates an enlarged view of an area "A" of FIG. 3.

Hereinafter, the fourth color filter having the plurality of holes will be described in detail with reference to FIG. 4 together with the above descriptions with reference to FIG. 3. FIG. 4 is an enlarged view of area "A" of FIG. 3.

Referring to FIGS. 3 and 4, the plurality of holes H of the fourth color filter CF4 according to the first exemplary embodiment may include a first hole H1, a second hole H2, and a third hole H3 which are adjacent to each other. The first, second, and third holes H1, H2, and H3 are spaced apart from each other at a substantially equal interval. For example, as illustrated in FIG. 4, when a center of the first hole H1 is defined as a first center C1, a center of the second hole H2 is defined as a second center C2, and a center of the third hole H2 is defined as a third center C3, a distance d1 between the first center C1 and the second center C2, a distance d2 between the second center C2 and the third center C3, and a distance d3 between the third center C3 and the first center C1 may be substantially equal to each other.

When an imaginary straight line passing through the first center C1 and the second center C2 is defined as a first straight line L1, and an imaginary straight line passing through the first center C1 and the third center C3 is defined as a second straight line L2, an angle θ between the first straight line L1 and the second straight line L2 may be in a range from about 20 degrees to about 80 degrees. For example, the angle θ between the first straight line L1 and the second straight line L2 according to a first exemplary embodiment may be about 60 degrees.

Accordingly, the fourth color filter CF4 may have the plurality of holes H within a limited area. In such an exemplary embodiment, as described above, an overlap area between the plurality of holes H and the pixel electrode 191 disposed at the fourth pixel area PX4 may be about 25% to about 45% of the planar area of the pixel electrode 191 disposed at the fourth pixel area PX4. Accordingly, in the display device according to the first exemplary embodiment, the luminance of the display device may be improved as the fourth color filter CF4 having the plurality of holes H is disposed at the fourth pixel area PX4.

Hereinafter, a second exemplary embodiment will be described with reference to FIG. 5. The descriptions of the same configurations as those of the first exemplary embodiment will be omitted for the sake of convenience of explanation.

Figure 5:
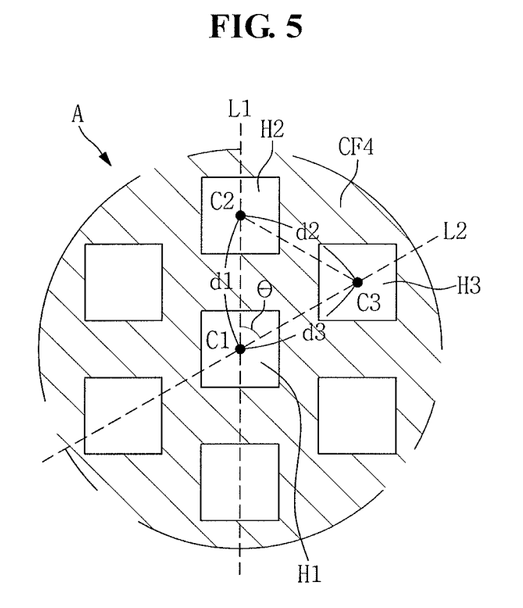
FIG. 5 illustrates a view corresponding to the area "A" of FIG. 3 according to another exemplary embodiment.

FIG. 5 is a view corresponding to the area "A" of FIG. 3 according to the second exemplary embodiment.

Referring to FIG. 5, the fourth color filter CF4 according to the second exemplary embodiment may include a plurality of holes H having a quadrangular shape on a plane. In such an exemplary embodiment, the plurality of holes H includes a first hole H1, a second hole H2, and a third hole H3 which are adjacent to each other.

The first, second, and third holes H1, H2, and H3 are spaced apart from each other at a substantially equal interval. For example, as illustrated in FIG. 5, when a center of the first hole H1 is defined as a first center C1, a center of the second hole H2 is defined as a second center C2, and a center of the third hole H2 is defined as a third center C3, a distance d1 between the first center C1 and the second center C2, a distance d2 between the second center C2 and the third center C3, and a distance d3 between the third center C3 and the first center C1 may be substantially equal to each other.

In addition, when an imaginary straight line passing through the first center C1 and the second center C2 is defined as a first straight line L1, and an imaginary straight line passing through the first center C1 and the third center C3 is defined as a second straight line L2, an angle θ between the first straight line L1 and the second straight line L2 may be in a range from about 20 degrees to about 80 degrees. For example, the angle θ between the first straight line L1 and the second straight line L2 according to a second exemplary embodiment may be about 60 degrees.

Accordingly, the fourth color filter CF4 may have the plurality of holes H within a limited area. In such an exemplary embodiment, as described above, an overlap area between the plurality of holes H and a pixel electrode 191 disposed at a fourth pixel area PX4 may be about 25% to about 45% of a planar area of the pixel electrode 191 disposed at the fourth pixel area PX4. Accordingly, in the display device according to a second exemplary embodiment, luminance of the display device may be improved as the fourth color filter CF4 having the plurality of holes H is disposed at the fourth pixel area PX4.

Hereinafter, a third exemplary embodiment will be described with reference to FIG. 6. The descriptions of the same configurations as those of the first exemplary embodiment will be omitted for the sake of convenience of explanation.

Figure 6:
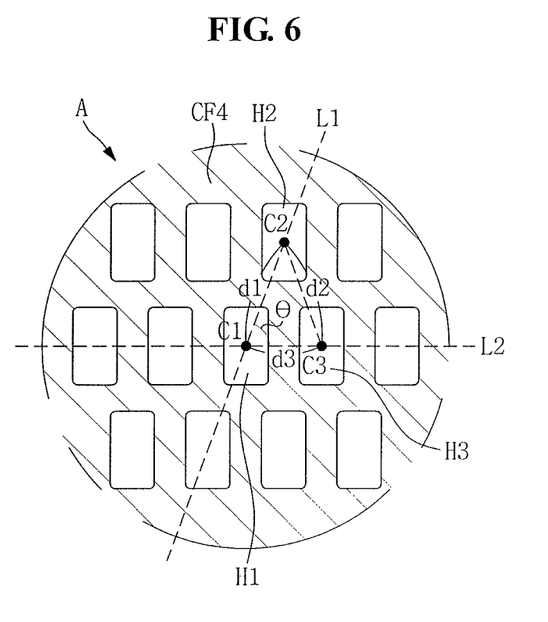
FIG. 6 illustrates a view corresponding to the area "A" of FIG. 3 according to another exemplary embodiment.

FIG. 6 is a view corresponding to the area "A" of FIG. 3 according to a third exemplary embodiment.

Referring to FIG. 6, a fourth color filter CF4 according to a third exemplary embodiment includes a plurality of holes H1, H2, and H3, each having a quadrangular shape on a plane. In such an exemplary embodiment, the plurality of holes H1, H2, and H3 having a quadrangular shape has a round shape at a vertex of the quadrangle. The plurality of holes H1, H2, and H3 includes a first hole H1, a second hole H2, and a third hole H3 which are adjacent to each other.

Dissimilar to the first and second exemplary embodiments, the first, second, and third holes H1, H2, and H3 according to the third exemplary embodiment are spaced apart from each other at a substantially equal interval or at different intervals. For example, as illustrated in FIG. 6, when a center of the first hole H1 is defined as a first center C1, a center of the second hole H2 is defined as a second center C2, and a center of the third hole H2 is defined as a third center C3, a distance d1 between the first center C1 and the second center C2 may be substantially equal to a distance d2 between the second center C2 and the third center C3, and may be different from a distance d3 between the third center C3 and the first center C1.

In addition, when an imaginary straight line passing through the first center C1 and the second center C2 is defined as a first straight line L1, and an imaginary straight line passing through the first center C1 and the third center C3 is defined as a second straight line L2, an angle θ between the first straight line L1 and the second straight line L2 may be in a range from about 20 degrees to about 80 degrees. For example, the angle θ between the first straight line L1 and the second straight line L2 according to a third exemplary embodiment may be about 70 degrees.

Accordingly, the fourth color filter CF4 may have the plurality of holes H within a limited area. In such an exemplary embodiment, as described above, an overlap area between the plurality of holes H and a pixel electrode 191 disposed at a fourth pixel area PX4 may be about 25% to about 45% of a planar area of the pixel electrode 191 disposed at the fourth pixel area PX4. Accordingly, in the display device according to a third exemplary embodiment, luminance of the display device may be improved as the fourth color filter CF4 having the plurality of holes H is disposed at the fourth pixel area PX4.

Hereinafter, a fourth exemplary embodiment will be described with reference to FIG. 7. The descriptions of the same configurations as those of the first exemplary embodiment will be omitted for the sake of convenience of explanation.

Figure 7:
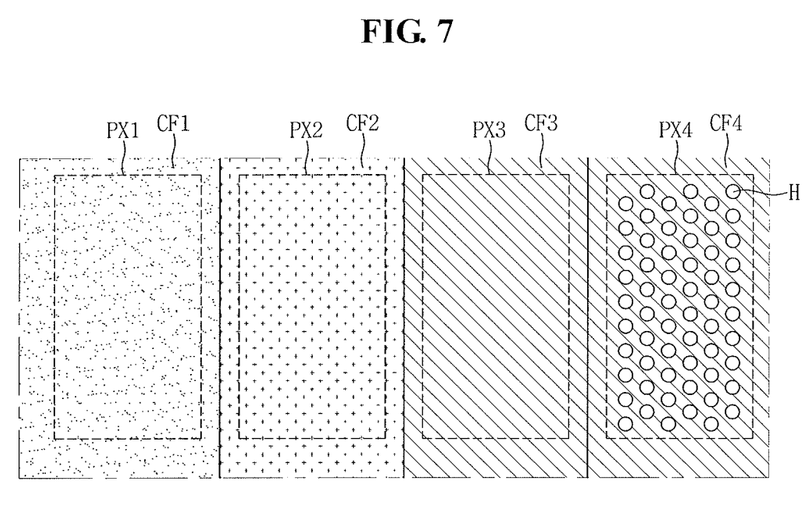
FIG. 7 illustrates a schematic plan view of a plurality of pixels according to another exemplary embodiment.

FIG. 7 is a plan view schematically illustrating a plurality of pixels according to a fourth exemplary embodiment.

Referring to FIG. 7, the fourth color filter CF4 according to the fourth exemplary embodiment is formed unitarily with the third color filter CF3. That is, the fourth color filter CF4 and the third color filter CF3 include a substantially same material and are formed substantially simultaneously in a substantially same process.

For example, the third and fourth color filters CF3 and CF4 may be unitarily formed through a photoresist process. For example, in order to form the third and fourth color filters CF3 and CF4, a photosensitive composition is applied onto a second substrate 210, and an exposure mask is disposed above the photosensitive composition to expose the photosensitive composition. The exposed photosensitive composition is developed with a developing solution and then cured to unitarily form the third and fourth color filters CF3 and CF4.

In addition, the light blocking layer BM (see FIG. 2) may be omitted in the display device according to the fourth exemplary embodiment. Accordingly, first, second, third, and fourth color filters CF1, CF2, CF3, and CF4 may overlap each other at a boundary area between corresponding adjacent ones of the first, second, third, and fourth color filters CF1, CF2, CF3 and CF4.

As the fourth color filter CF4 according to the fourth exemplary embodiment is unitarily formed with the third color filter CF3, a step difference at a fourth pixel area PX4 which is a white W pixel area may be compensated without performing an additional process. As the step difference is compensated, visibility of the display device may be improved.

Hereinafter, a fifth exemplary embodiment will be described with reference to FIG. 8. The descriptions of the same configurations as those of the first exemplary embodiment will be omitted for the sake of convenience of explanation.

Figure 8:
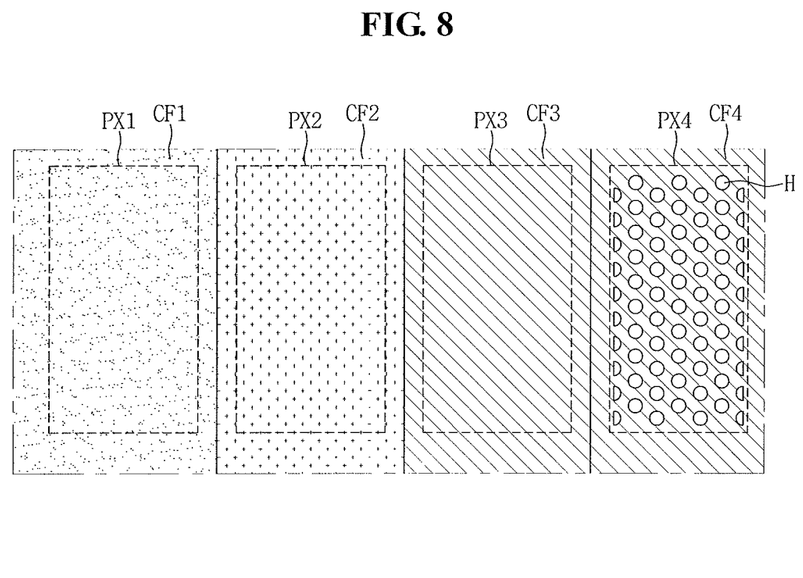
FIG. 8 illustrates a schematic plan view of a plurality of pixels according to another exemplary embodiment.

FIG. 8 is a plan view schematically illustrating a plurality of pixels according to a fifth exemplary embodiment.

Referring to FIG. 8, a plurality of holes H of a fourth color filter CF4 according to the fifth exemplary embodiment have a semicircular shape in at least a part of an edge area of a fourth pixel area PX4. Accordingly, mura that may appear due to the plurality of holes H at the edge area of the fourth pixel area PX4 may be substantially prevented from being visible.

Figure 9:
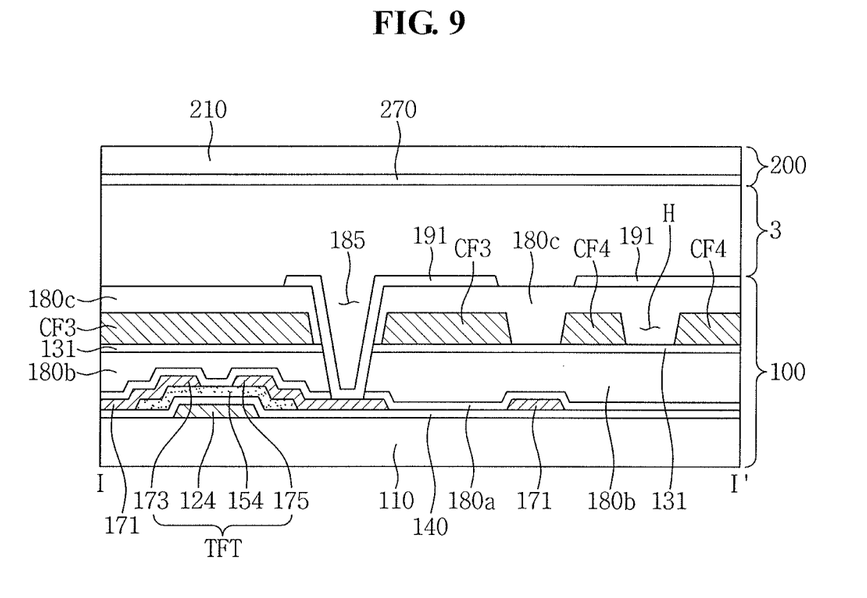
FIG. 9 illustrates a cross-sectional view of a display device according to another exemplary embodiment.

FIG. 9 is a cross-sectional view illustrating a display device according to a sixth exemplary embodiment.

Referring to FIG. 9, in a display device according to the sixth exemplary embodiment, first, second, third, and fourth color filters CF1, CF2, CF3, and CF4 are disposed on the first substrate 110. For example, the TFT, the gate line 121, the data line 171, the gate insulating layer 140, the first insulating layer 180a, and the second insulating layer 180a of the display device according to the sixth exemplary embodiment have substantially same configurations and disposition as those of the first exemplary embodiment.

A reflective layer 131 may be disposed on the second insulating layer 180b. The reflective layer 131 may be disposed over an entire surface of the first substrate 110 except for a contact hole 185 exposing a drain electrode 175 in order to increase reflectivity of an external light. The reflective layer 131 may be positioned between the second insulating layer 180b and the first, second, third, and fourth color filters CF1, CF2, CF3, and CF4. The reflective layer 131 may include a reflective metal, e.g., aluminum, silver, chromium, or an alloy thereof.

In an exemplary embodiment, the reflective layer 131 may not be connected to signal lines such as the gate line 121 and the data line 171, and only serve to reflect light incident from the outside. In addition, the reflective layer 131 may include irregularities on a surface of the reflective layer 131 in order to increase the reflection efficiency for the light incident from the outside.

The first, second, third, and fourth color filters CF1, CF2, CF3, and CF4 may be positioned on the reflective layer 131. The first, second, third, and fourth color filters CF1, CF2, CF3, and CF4 may be disposed in correspondence with the first, second, third, and fourth pixel areas PX1, PX2, PX3, and PX4, respectively.

A third insulating layer 180c may be disposed on the reflective layer 131 and the first, second, third, and fourth color filters CF1, CF2, CF3, and CF4. The third insulating layer 180c may be an inorganic insulating layer or an organic insulating layer. The reflective layer 131 may substantially prevent components of the first, second, third, and fourth color filters CF1, CF2, CF3, and CF4 from being exposed to the outside and substantially prevent deformation or discoloration of the first, second, third, and fourth color filters CF1, CF2, CF3, and CF4.

By way of summation and review, display devices having a four-color pixel structure which is capable of providing improved luminance and resolution by adding a white pixel to three color pixels of red, green, and blue have been recently manufactured. In such an example, while a color filter is formed for each pixel, a white color filter is not formed at a white pixel, in order to improve the process efficiency. However, a step difference is generated between the color pixel and the white pixel, such that visibility in the white pixel becomes lowered.

In contrast, the display device according to one or more exemplary embodiments includes a color filter with a plurality of holes arranged in a zigzag manner in the white pixel area. As such, the display device improves visibility and luminance in the white pixel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a substrate including first, second, third, and fourth pixel areas;
   first, second, and third color filters at the first, second, and third pixel areas on the substrate, respectively; and
   a fourth color filter at the fourth pixel area on the substrate, the fourth color filter having a plurality of holes,
   wherein the plurality of holes includes a first hole, a second hole, and a third hole adjacent to each other, and
   wherein a first imaginary straight line passing through a center of the first hole and a center of the second hole has an angle in a range from about 20 degrees to about 80 degrees with respect to a second imaginary straight line passing through the center of the first hole and a center of the third hole.

2. The display device as claimed in claim 1, wherein a distance between the center of the first hole and the center of the second hole, a distance between the center of the second hole and the center of the third hole, and a distance between the center of the third hole and the center of the first hole are substantially equal to each other.

3. The display device as claimed in claim 1, wherein the plurality of holes is arranged in a zigzag manner.

4. The display device as claimed in claim 1, wherein the plurality of holes have one of a circular shape, an elliptical shape, a semicircular shape, and a polygonal shape on a plane.

5. The display device as claimed in claim 4, wherein the plurality of holes has a polygonal shape on a plane, a vertex of the polygon having a round shape.

6. The display device as claimed in claim 4, wherein the plurality of holes has a semicircular shape in at least a part of an edge area of the fourth pixel area.

7. The display device as claimed in claim 1, wherein the first color filter is a red color filter, the second color filter is a green color filter, and the third color filter is a blue color filter.

8. The display device as claimed in claim 7, wherein the fourth color filter includes a material that is substantially the same as a material in at least one of the first, second, and third color filters.

9. The display device as claimed in claim 8, wherein the fourth color filter and the third color filter are unitary.

10. The display device as claimed in claim 1, further comprising a plurality of pixel electrodes at the first, second, third, and fourth pixel areas on the substrate, respectively.

11. The display device as claimed in claim 10, wherein an overlap area between the plurality of holes and the pixel electrode at the fourth pixel area is about 25% to about 45% of a planar area of the pixel electrode at the fourth pixel area.

12. The display device as claimed in claim 10, wherein the plurality of pixel electrodes includes a conductive material having reflectance.

13. The display device as claimed in claim 10, further comprising a plurality of thin film transistors connected to the plurality of pixel electrodes, respectively.

14. The display device as claimed in claim 1, further comprising a reflective layer between the substrate and the first, second, third, and fourth color filters.

\* \* \* \* \*